US012573930B2

(12) United States Patent
Wen et al.

(10) Patent No.: US 12,573,930 B2
(45) Date of Patent: Mar. 10, 2026

(54) VIBRATION GENERATOR WITH CONTROL AND VIBRATION ASSEMBLIES IN HOUSING AND ELECTRONIC DEVICE HAVING THE SAME

(71) Applicant: Transound Electronics Co., Ltd., Dongguan (CN)

(72) Inventors: Tseng-Feng Wen, New Taipei (TW); Hui Xue, Dongguan (CN); Zhi-Jian He, Dongguan (CN); Yan-Fang Chen, Dongguan (CN)

(73) Assignee: Transound Electronics Co., Ltd., Dongguan (CN)

( * ) Notice: Subject to any disclaimer, the term of this patent is extended or adjusted under 35 U.S.C. 154(b) by 183 days.

(21) Appl. No.: 18/415,859

(22) Filed: Jan. 18, 2024

(65) Prior Publication Data

US 2025/0175067 A1     May 29, 2025

(30) Foreign Application Priority Data

Nov. 23, 2023    (CN) .......................... 202323175294.5

(51) Int. Cl.
H02K 33/16        (2006.01)
H02K 33/18        (2006.01)

(52) U.S. Cl.
CPC ............. *H02K 33/18* (2013.01); *H02K 33/16* (2013.01)

(58) Field of Classification Search
CPC ............................... H02K 33/16; H02K 33/18
See application file for complete search history.

(56) References Cited

U.S. PATENT DOCUMENTS

| | | | | | |
|---|---|---|---|---|---|
| 5,602,432 | A | * | 2/1997 | Mizutani ................ | H02K 33/16 |
| | | | | | 310/15 |
| 7,564,335 | B1 | * | 7/2009 | Yang ....................... | H01F 27/29 |
| | | | | | 336/192 |
| 2003/0072441 | A1 | * | 4/2003 | Kobayashi .............. | B06B 1/045 |
| | | | | | 379/431 |
| 2020/0025217 | A1 | * | 1/2020 | Lucas .................... | H02K 33/06 |
| 2020/0127547 | A1 | * | 4/2020 | Takahashi .............. | H02K 33/18 |

* cited by examiner

*Primary Examiner* — Tulsidas C Patel
*Assistant Examiner* — Robert E Mates
(74) *Attorney, Agent, or Firm* — ScienBiziP, P.C.

(57) ABSTRACT

A vibration generator is provided, which includes a housing defining a receiving space, a control assembly fixed in the receiving space, and a vibration assembly received in the receiving space. The control assembly can generate an alternating magnetic field. The vibration assembly is movably received in the receiving space and includes a magnet and a vibration sheet. The vibration sheet is connected to the magnet and the housing. The magnet is configured to vibrate back and forth in the alternating magnetic field and transmits the vibrations to the housing.

16 Claims, 8 Drawing Sheets

001

001

VIBRATION GENERATOR WITH CONTROL AND VIBRATION ASSEMBLIES IN HOUSING AND ELECTRONIC DEVICE HAVING THE SAME

FIELD

The subject matter relates to electromagnetic vibration, and more particularly, to a vibration generator and an electronic device having the vibration generator.

BACKGROUND

A vibration generator may be installed in an electronic product such as a smartphone, a smart wristband, or a reading pen. Such vibration generator can vibrate in response to input from a user, thereby providing feedback or reminder to improve the user experience. However, the existing vibration generator may have a complex structure and occupy a large space.

Therefore, there is room for improvement in the art.

SUMMARY

The present disclosure provides a vibration generator, including a housing, a control assembly, and a vibration assembly. The housing defines a receiving space. The control assembly is fixed in the receiving space and configured to generate an alternating magnetic field, and directions of magnetic poles of the alternating magnetic field being periodically alternated. The vibration assembly is movably received in the receiving space and includes a magnet and a vibration sheet. The vibration sheet is connected to the magnet and the housing. The magnet is configured to vibrate back and forth in the alternating magnetic field and transmits vibrations to the housing.

The present disclosure provides an electronic device, including the above vibration generator.

Other aspects and embodiments of the present disclosure are also expected. The above summary and the following detailed description are not intended to limit the present disclosure to any particular embodiment, but are merely intended to describe at least one embodiment of the present disclosure.

BRIEF DESCRIPTION OF THE DRAWINGS

Implementations of the present technology will now be described, by way of example only, with reference to the attached figures.

DETAILED DESCRIPTION

Implementations of the present disclosure will now be described, by way of embodiments only, with reference to the drawings. The described embodiments are only at least one embodiment of the present disclosure, rather than all the embodiments.

It should be noted that when a component is referred to as being or "mounted on" another component, the component can be directly on another component or a middle component may exist therebetween. When a component is considered to be "disposed on" another component, the component can be directly on another component or a middle component may exist therebetween.

Implementations of the disclosure will now be described, by way of embodiments only, with reference to the drawings. It should be noted that the embodiments and the features of the present disclosure can be combined without conflict.

Figure 1:
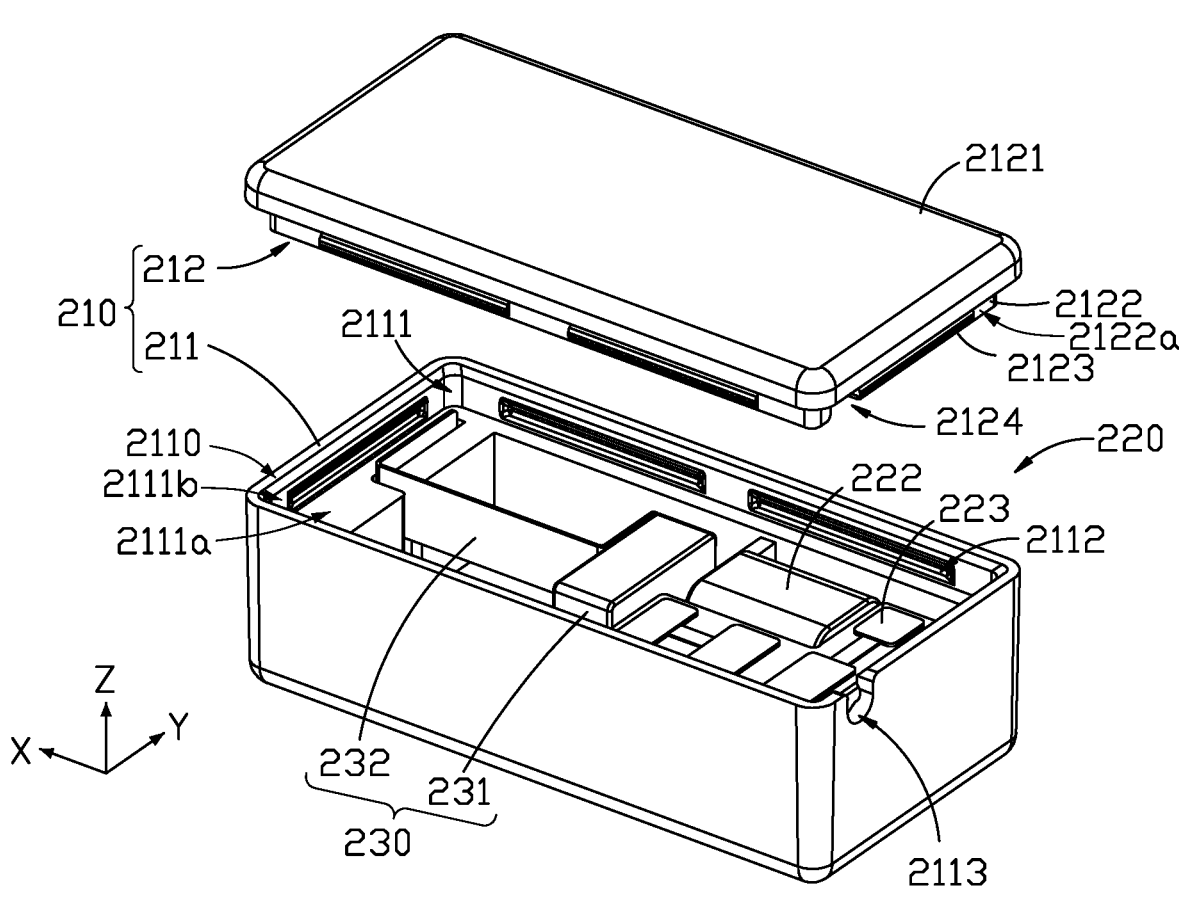
FIG. 1 is an exploded view of a vibration generator according to an embodiment of the present application.

Referring to FIG. 1, a vibration generator 001 is provided according to an embodiment of the present application. The vibration generator 001 includes a housing 210, a control assembly 220, and a vibration assembly 230. The housing 210 defines a receiving space 200. The control assembly 220 and the vibration assembly 230 are both received in the receiving space 200. The control assembly 220 is used to generate an alternating magnetic field, and directions of the magnetic poles of the alternating magnetic field are periodically alternated. The vibration assembly 230 is used to move back and forth in the alternating magnetic field.

Figure 2:
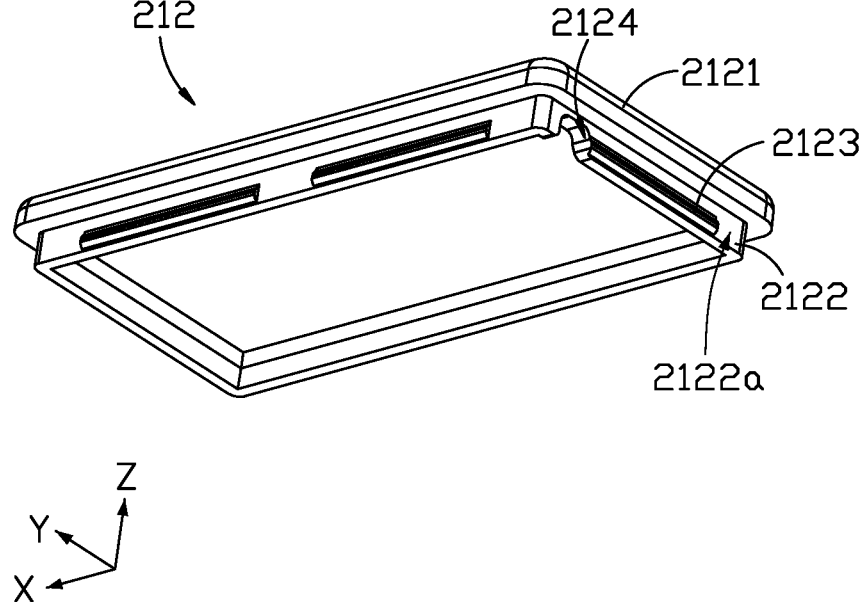
FIG. 2 is a diagrammatic view of an upper cover of the vibration generator shown in FIG. 1.
Figure 3:
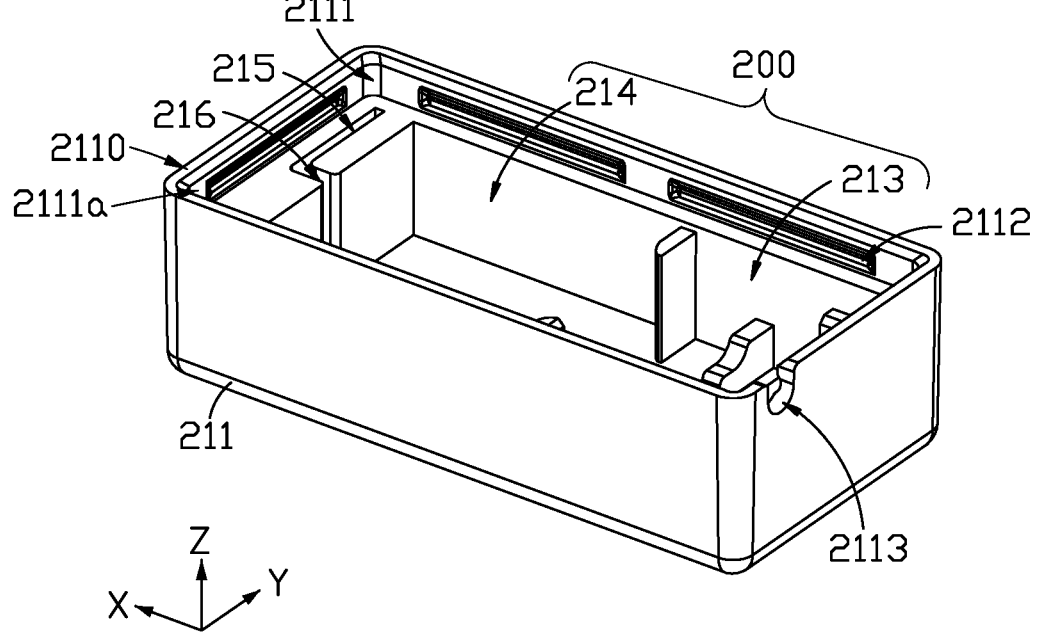
FIG. 3 is a diagrammatic view of a lower cover of the vibration generator shown in FIG. 1.

Referring to FIGS. 1 to 3, the housing 210 includes a lower cover 211 and an upper cover 212 connected to the lower cover 211. The lower cover 211 and the upper cover 212 cooperatively defines the receiving space 200. A top surface 2110 of the lower cover 211 facing the upper cover 212 defines a groove 2111. The groove 2111 has a bottom surface 2111a and an inner sidewall 2111b connected to the bottom surface 2111a. The bottom surface 2111a of the groove 2111 is lower than the top surface 2110 of the lower cover 211. The upper cover 212 includes a cover body 2121 and a convex stage 2122 protruding from the lower surface of the cover body 2121 facing the lower cover 211. When the upper cover 212 is placed on the lower cover 211, the convex stage 2122 is inserted into the groove 2111, thereby facilitating the assembly of the upper cover 212 and the lower cover 211. Furthermore, an adhesive (not shown) may be located in the gap between the convex stage 2122 and the groove 2111, thereby increasing the connection stability and sealing performance of the housing 210. For example, the adhesive may be applied in the gap between the convex stage 2122 and the bottom surface 2111a of the groove 2111. The adhesive may also be applied in the gap between the convex stage 2122 and the inner sidewall 2111b of the groove 2111.

Furthermore, the inner sidewall 2111b of the groove 2111 defines a recess 2112. The upper cover 212 further includes a protrusion 2123 protruding from an outer sidewall 2122a of the convex stage 2122. The protrusion 2123 is inserted into the recess 2112, so that the upper cover 212 and the lower cover 211 can be detachably assembled to each other. Moreover, the assemble and disassemble of the housing 210 are simple, thereby facilitating the maintenance of the vibration generator 001.

The housing 210 has a first direction X and a second direction Y perpendicular to the first direction X. The first direction X may be a length direction of the housing 210, and the second direction Y may be a width direction of the housing 210. The number of the recess(es) 2112 may be multiple, and the number of the protrusion(s) 2123 may also be multiple. For example, two recesses 2112 may be defined at one inner sidewall 2111*b* of the groove 2111 extending along the first direction X, and two protrusions 2123 may protrude from the corresponding position of the convex stage 2122 to engage with the two recesses 2112. For example, one recess 2112 may be defined at one inner sidewall 2111*b* of the groove 2111 extending along the second direction Y, and one protrusion 2123 may protrude from the corresponding position of the convex stage 2122 to engage with the recess 2112.

Figure 4:
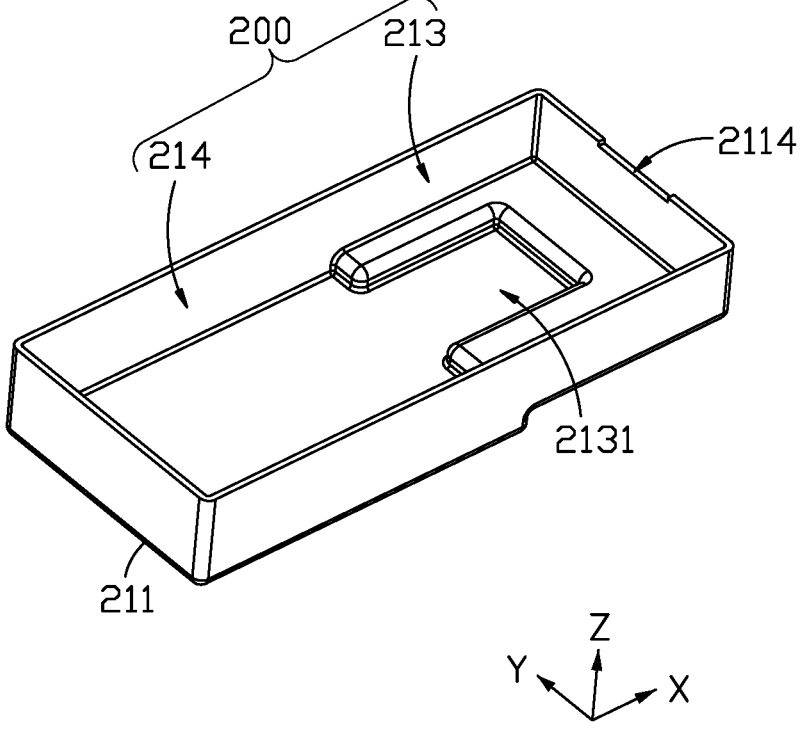
FIG. 4 is a diagrammatic view of a lower cover according to another embodiment of the present application.

Referring to FIGS. 1 and 3, the receiving space 200 includes a first chamber 213 and a second chamber 214 communicating with the first chamber 213. The first chamber 213 and the second chamber 214 may be arranged along the first direction X. The control assembly 220 is fixed in the first chamber 213 such as by adhesive. Referring to FIG. 4, in another embodiment, the first chamber 213 has a clamping position 2131. The control assembly 220 is clamped in the clamping position 2131. This facilitates the quick positioning of the control assembly 220 in the first chamber 212 and improves the assembly efficiency of the control assembly 220.

The vibration assembly 230 is movably received in the second chamber 214. The vibration assembly 230 includes a magnet 231 and a vibration sheet 232 fixed to the magnet 231. The vibration sheet 232 is further fixed to the lower cover 211. Since the vibration sheet 232 is fixed to the lower cover 211, the magnet 231 can move back and forth in the alternating magnetic field along the second direction Y and collide with the lower cover 211 along the second direction Y. Thus, the control assembly 220 can control the magnet 231 to linearly move, which can improve the driving efficiency of the control assembly 220. Furthermore, by connecting the vibration sheet 232 to the lower cover 211, the movement and vibration of the magnet 231 can be transmitted to the housing 210, thereby allowing the whole housing 210 to vibrate. That is, the lower cover 211 may both have a protection function for protecting the components inside, and also cooperate with the magnet 231 to generate vibration. Thus, the number of components for vibration is reduced, and the space utilization of the vibration assembly 230 is improved. During the assembly process, the vibration sheet 232 and the magnet 231 are first installed into the lower cover 211, and then the control assembly 220 is installed into the lower cover 211. Such assembly process is simple.

Figure 5:
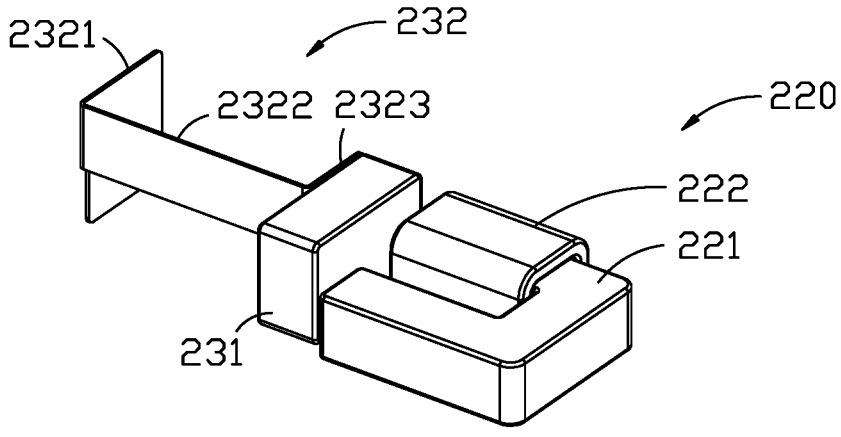
FIG. 5 is a diagrammatic view showing a control assembly and a vibration assembly installed in the lower cover shown in FIG. 3.

Referring to FIG. 3, in at least one embodiment, the bottom surface 2111*a* of the groove 2111 further defines a first slot 215 and a second slot 216. Both of the first slot 215 and the second slot 216 are located at the sidewall of the second chamber 214 away from the first chamber 213. The second slot 216 connects the first slot 215 to the second chamber 214. Referring to FIG. 5, the vibration sheet 232 includes a main body portion 2322 and a first bent portion 2321 connected to the main body portion 2322. The first bent portion 2321 is bent relative to the main body portion 2322 and fixed in the first slot 215. The main body portion 2322 is at least partially fixed in the second slot 216. Since the vibration sheet 232 is fixed to the first slot 215 and the second slot 216, the magnet 231 can move back and forth in the alternating magnetic field along the second direction Y (that is, vibrate along the second direction Y). Furthermore, the stability of the vibration sheet 232 during the vibration process is improved.

The vibration sheet 232 may further include a second bent portion 2323. The second bent portion 2323 is connected to an end of the main body portion 2322 away from the first bent portion 2321. The second bent portion 2323 is bent relative to the main body portion 2322. The second bent portion 2323 is attached and fixed to the magnet 231, thereby increasing the fixing area between the vibration sheet 232 and the magnet 231. For example, the second bent portion 2323 may be fixed to the magnet 231 by adhesive. The second bent portion 2323 may also be fixed to the magnet 231 by fasteners (such as bolts), so that the second bent portion 2323 can be detachably connected to the magnet 231 to facilitate the maintenance of the vibration generator 001. Thus, when the magnet 231 is driven to move in the alternating magnetic field, the connection stability between magnet 231 and the vibration sheet 232 can be improved.

Figure 6:
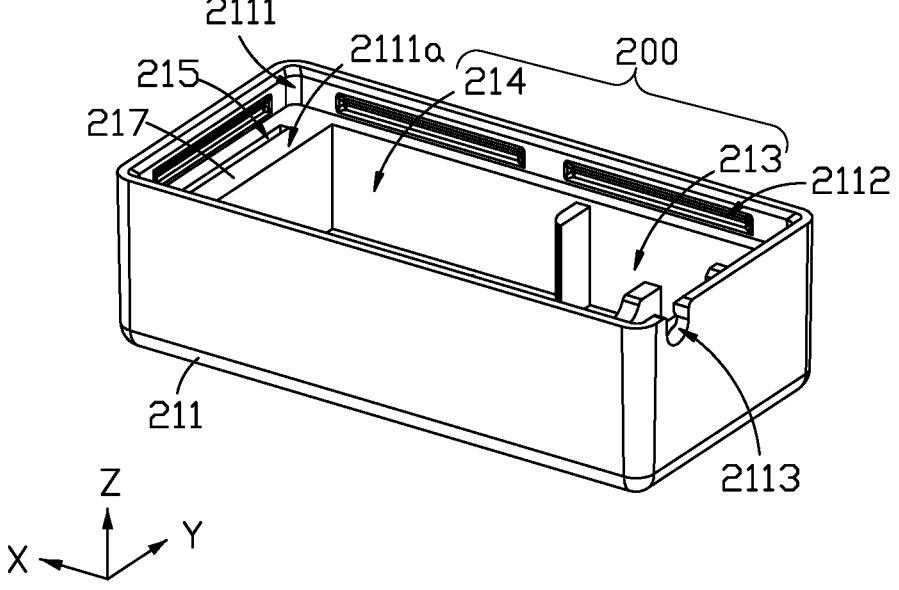
FIG. 6 is a diagrammatic view of a lower cover according to yet another embodiment of the present application.
Figure 7:
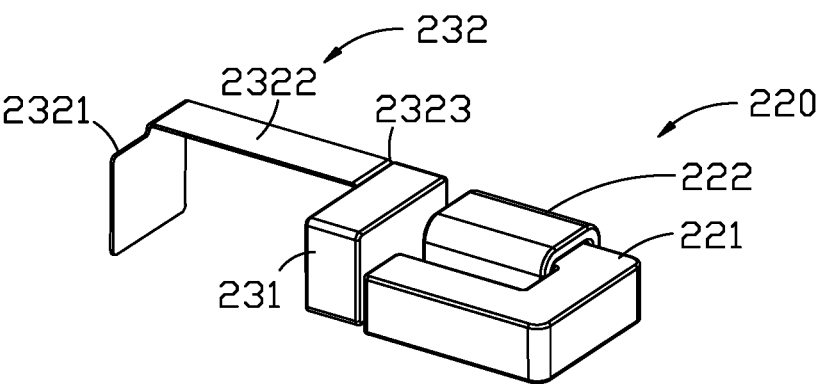
FIG. 7 is a diagrammatic view showing a control assembly and a vibration assembly installed in the lower cover shown in FIG. 6.

Referring to FIG. 6, in another embodiment, the first bent portion 2321 is fixed in the first slot 215, but the second slot 216 may be omitted. Instead, the lower cover 211 is provided with a barrier portion 217, which is located between the first slot 215 and the second chamber 214. The barrier portion 217 separates the first slot 215 from the second chamber 214. The main body portion 2322 is located above and covers a supporting surface of the barrier portion 217 (that is, the bottom surface 2111*a* of the groove 2111) to connect the first bent portion 2321 to the second bent portion 2323. For example, the main body portion 2322 may be spaced from the bottom surface 2111*a*. The main body portion 2322 may also be in contact with the bottom surface 2111*a*. In this way, the magnet 231 can move back and forth in the alternating magnetic field along a third direction Z (that is, vibrate along the third direction Z), and the third direction Z is perpendicular to the first direction X and the second direction Y. During assembly, after the second bent portion 2323 is fixed to the magnet 231, the first bent portion 2321 can be clamped in the first slot 215. Thus, the vibration assembly 230 is easy to install, and the lower cover 211 can have a simple structure.

Referring to FIGS. 1 and 5, the control assembly 220 includes a magnetizer 221, a coil 222, and a circuit board 223. The magnetizer 221 is fixed on the bottom surface of the first chamber 213 and faces the magnet 231. The coil 222 is wound around the magnetizer 221 to generate the alternating magnetic field, so that the magnet 231 can move back and forth in the alternating magnetic field. The circuit board 223 is electrically connected to the coil 222, and can control the current applied to the coil 222. Thus, different vibration frequencies or amplitudes can be achieved. The circuit board 223 may be a flexible circuit board or a flexible-rigid circuit board.

In at least one embodiment, the housing 210 defines a channel. The channel may include a first hole 2113 and a second hole 2124. The first hole 2113 extends through the inner sidewall 2111*b* of the groove 2111. The second hole 2124 extends through the outer sidewall 2122*a* of the convex stage 2122. The first hole 2113 is aligned with and communicates with the second hole 2124. The circuit board 223 includes an electrical connecting member (not shown) passing through the channel. The electrical connecting member may be a wire, which can pass through the first hole 2113 and the second hole 2124. Thus, an external device can supply electric power to the circuit board 223 through the electrical connecting member. The external device can also transmit control signals to the circuit board 223 through the electrical connecting member. In another embodiment, the circuit board 223 may also be fully received in the housing 210.

Referring to FIG. 1, the first hole 2113 may be located at the inner sidewall 2111*b* of the groove 2111 extending along the second direction Y, so that the electrical connecting member can directly extend out of the housing 210 without the need to bend the electrical connecting member, thereby facilitating the assembly process. The first hole 2113 may also be located on the inner sidewall 2111*b* of the groove 2111 extending along the first direction X, so that the electrical connecting member can be extend out of the housing 210 to avoid other internal components of the vibration generator 001.

Referring to FIG. 4, in another embodiment, the shape of the channel may also be changed. For example, the first hole 2113 of the lower cover 211 may be replaced by a cutout 2114 defined on the top surface 2110 of the lower cover 211. Correspondingly, the electrical connecting member may be a flexible portion of the circuit board 223, which passes through the cutout 2114. For simplicity, the groove 2111 may be omitted from FIG. 4.

In at least one embodiment, the magnetizer 221 includes a number of silicon steel sheets stacked together. Since the magnetic permeability of iron is at least several thousands of times higher than the magnetic permeability of air, the magnetic flux density of the iron core after magnetization is high, which can generate a magnetic field much stronger than an external magnetic field. Furthermore, silicon steel has a core loss more than half lower than that of the existing low-carbon steel. Thus, the magnetizer 221 can have a magnetic field with improved strength, thereby enhancing the vibration effect of the vibration generator 001.

Figure 8:
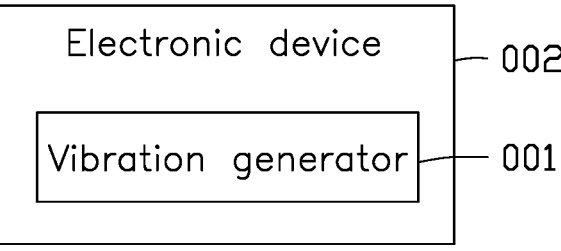
FIG. 8 is a block diagram of an electronic device according to an embodiment of the present application.

Referring to FIG. 8, an electronic device 002 is further provided according to an embodiment of the present application. The electronic device 002 include the vibration generator 001 mentioned above. The housing 210 of the vibration generator 001 may be the housing of the electronic device 002. The housing 210 of the vibration generator 001 may also be inside the housing of the electronic device 002. In at least one embodiment, the electronic device 002 may be a smartphone, a smart wristband, or a reading pen.

With the above configuration, the magnetizer 221 generates an alternating magnetic field, and the directions of the magnet poles of the alternating magnetic field are periodically alternated. The magnetizer 221 controls the magnet 231 to move back and forth and collide with the lower cover 211, thereby allowing the vibration generator 001 to generate linear vibrations.

Even though information and advantages of the present embodiments have been set forth in the foregoing description, together with details of the structures and functions of the present embodiments, the present disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A vibration generator comprising:
a housing defining a receiving space;
a control assembly fixed in the receiving space and configured to generate an alternating magnetic field, and directions of magnetic poles of the alternating magnetic field being periodically alternated; and

a vibration assembly movably received in the receiving space, wherein the vibration assembly comprises a magnet and a vibration sheet, the vibration sheet is connected to the magnet and the housing, the magnet is configured to vibrate back and forth in the alternating magnetic field and transmits vibrations to the housing;
wherein the housing further comprises a lower cover and an upper cover, the lower cover and the upper cover cooperatively define the receiving space, the receiving space comprises a first chamber and a second chamber communicating with the first chamber, the control assembly is fixed in the first chamber, and the vibration assembly is movably received in the second chamber;
wherein the lower cover defines a first slot and a second slot, the second slot connects the first slot to the second chamber, the vibration sheet comprises a main body portion and a first bent portion connected to the main body portion, the first bent portion is fixed in the first slot, and the main body portion is at least partially fixed in the second slot, and is fixed to the magnet.

2. The vibration generator according to claim 1, wherein the first chamber has a clamping position, and the control assembly is clamped in the clamping position.

3. The vibration generator according to claim 1, wherein the control assembly comprises a magnetizer, a coil, and a circuit board, the magnetizer is fixed in the first chamber and faces the magnet, the coil is wound around the magnetizer to enable the magnetizer to generate the alternating magnetic field, and the circuit board is electrically connected to the coil.

4. The vibration generator according to claim 3, wherein the magnetizer comprises of a plurality of silicon steel sheets stacked together.

5. The vibration generator according to claim 3, wherein the lower cover defines a channel, and the circuit board extends through the channel.

6. The vibration generator according to claim 5, wherein the channel comprises a first hole defined at the lower cover and a second hole defined at the upper cover, and the first hole and the second hole are aligned with and communicate with each other.

7. The vibration generator according to claim 1, wherein the vibration sheet further comprises a second bent portion, the main body portion is between the first bent portion and the second bent portion, and the main body portion is further fixed to the magnet through the second bent portion.

8. The vibration generator according to claim 1, wherein the lower cover defines a first slot separated from the second chamber, the vibration sheet comprises a main body portion and a first bent portion connected to the main body portion, the first bent portion is fixed in the first slot, and the main body portion is further fixed to the magnet.

9. An electronic device comprising:
a vibration generator comprising:
a housing defining a receiving space;
a control assembly fixed in the receiving space and configured to generate an alternating magnetic field, and directions of magnetic poles of the alternating magnetic field being periodically alternated; and
a vibration assembly movably received in the receiving space, wherein the vibration assembly comprises a magnet and a vibration sheet, the vibration sheet is connected to the magnet and the housing, the magnet is configured to vibrate back and forth in the alternating magnetic field and transmits vibrations to the housing;
wherein the housing further comprises a lower cover and an upper cover, the lower cover and the upper cover cooperatively define the receiving space, the receiving space comprises a first chamber and a second chamber communicating with the first chamber, the control assembly is fixed in the first chamber, and the vibration assembly is movably received in the second chamber; wherein the lower cover defines a first slot and a second slot, the second slot connects the first slot to the second chamber, the vibration sheet comprises a main body portion and a first bent portion connected to the main body portion, the first bent portion is fixed in the first slot, and the main body portion is at least partially fixed in the second slot, and is fixed to the magnet.

10. The electronic device according to claim 9, wherein the first chamber has a clamping position, and the control assembly is clamped in the clamping position.

11. The electronic device according to claim 9, wherein the control assembly comprises a magnetizer, a coil, and a circuit board, the magnetizer is fixed in the first chamber and faces the magnet, the coil is wound around the magnetizer to enable the magnetizer to generate the alternating magnetic field, and the circuit board is electrically connected to the coil.

12. The electronic device according to claim 11, wherein the magnetizer comprises of a plurality of silicon steel sheets stacked together.

13. The electronic device according to claim 11, wherein the lower cover defines a channel, and the circuit board extends through the channel.

14. The electronic device according to claim 13, wherein the channel comprises a first hole defined at the lower cover and a second hole defined at the upper cover, and the first hole and the second hole are aligned with and communicate with each other.

15. The electronic device according to claim 9, wherein the vibration sheet further comprises a second bent portion, the main body portion is between the first bent portion and the second bent portion, and the main body portion is further fixed to the magnet through the second bent portion.

16. The electronic device according to claim 9, wherein the lower cover defines a first slot separated from the second chamber, the vibration sheet comprises a main body portion and a first bent portion connected to the main body portion, the first bent portion is fixed in the first slot, and the main body portion is further fixed to the magnet.

* * * * *